(12) United States Patent
Levisse et al.

(10) Patent No.: US 11,994,073 B2
(45) Date of Patent: May 28, 2024

(54) AIRCRAFT TURBOMACHINE

(71) Applicant: SAFRAN AIRCRAFT ENGINES, Paris (FR)

(72) Inventors: Paul Ghislain Albert Levisse, Moissy-Cramayel (FR); Julien Fabien Patrick Becoulet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/906,790

(22) PCT Filed: Mar. 25, 2021

(86) PCT No.: PCT/FR2021/050521
§ 371 (c)(1),
(2) Date: Sep. 20, 2022

(87) PCT Pub. No.: WO2021/191569
PCT Pub. Date: Sep. 30, 2021

(65) Prior Publication Data
US 2023/0145716 A1 May 11, 2023

(30) Foreign Application Priority Data
Mar. 27, 2020 (FR) ...................................... 2003020

(51) Int. Cl.
*F02C 7/36* (2006.01)
*F01D 15/12* (2006.01)
*F01D 25/16* (2006.01)
*F02C 3/06* (2006.01)
*F02C 3/107* (2006.01)
(Continued)

(52) U.S. Cl.
CPC ................ *F02C 7/36* (2013.01); *F01D 15/12* (2013.01); *F01D 25/16* (2013.01); *F02C 3/06* (2013.01); *F02C 3/107* (2013.01); *F02C 7/06* (2013.01); *F02K 3/06* (2013.01); *F16H 1/28* (2013.01);
(Continued)

(58) Field of Classification Search
CPC ............. F02C 3/107; F02C 7/36; F01D 15/12
See application file for complete search history.

(56) References Cited

U.S. PATENT DOCUMENTS 4,251,987 A * 2/1981 Adamson ................ F02C 3/113
60/226.1
6,223,616 B1 5/2001 Sheridan
(Continued)

FOREIGN PATENT DOCUMENTS

EP 1921290 A2 5/2008

OTHER PUBLICATIONS

International Search Report issued in International Application No. PCT/FR2021/050521 dated Sep. 17, 2021 (2 pages).

*Primary Examiner* — Brian O Peters
(74) *Attorney, Agent, or Firm* — Bookoff McAndrews, PLLC

(57) ABSTRACT

Aircraft turbomachine comprising a casing, a fan, a compressor and a turbine and an epicyclic gear train comprising an input driven in rotation by the turbine, a first output stage configured to drive in rotation the compressor and a second output stage coupled to the first output stage and configured to drive in rotation the fan, the compressor being driven in rotation by the ring gear of the first output stage.

13 Claims, 4 Drawing Sheets

(51) Int. Cl.
*F02C 7/06* (2006.01)
*F02K 3/06* (2006.01)
*F16H 1/28* (2006.01)

(52) U.S. Cl.
CPC .... *F05D 2220/323* (2013.01); *F05D 2240/50* (2013.01); *F05D 2260/40* (2013.01)

(56) References Cited

U.S. PATENT DOCUMENTS

2007/0087892 A1* 4/2007 Orlando ................ F02K 3/072
                                                                         475/348
2014/0064915 A1* 3/2014 Masson .................. F02C 7/36
                                                                   415/60

* cited by examiner

AIRCRAFT TURBOMACHINE

CROSS-REFERENCE TO RELATED APPLICATION(S)

This patent application is a national stage entry of International Application Number PCT/FR2021/050521, filed on Mar. 25, 2021, which claims benefit to French Application No. FR2003020, filed on Mar. 27, 2020.

TECHNICAL FIELD

This present disclosure relates to the field of aircrafts, and more particularly a turbomachine that can be used for aeronautical propulsion.

PRIOR ART

The turbomachines used for the propulsion of aircrafts, for example turbojet engines, generally comprise a casing in which a fan providing most of the thrust, a compressor and a turbine are housed. The compressor supplies compressed air to a combustion chamber and the combustion gases produced in said chamber set in motion the turbine, which in turn drives the fan.

To maximize the efficiency of the turbine, it is desirable that it rotates as quickly as possible. Conversely, the speed of the fan is limited by the speed of rotation at the blade tip, which must most often remain lower than the speed of sound.

To overcome this problem, turbomachines equipped with a reduction gear placed in the transmission chain between the turbine and the fan have been known. A reduction gear allows rotating the turbine and the fan at different speeds.

There is nevertheless still a need to improve aircraft turbomachines.

DISCLOSURE OF THE INVENTION

To this end, the present disclosure relates to an aircraft turbomachine comprising a casing, a fan, a compressor and a turbine, and an epicyclic gear train comprising an input driven in rotation by the turbine, a first output stage configured to drive in rotation the compressor and a second output stage coupled to the first output stage and configured to drive in rotation the fan, the compressor being driven in rotation by the ring gear of the first output stage.

The casing designates a generally fixed portion of the turbomachine, the fan, the compressor and the turbine comprising bladed wheels configured to rotate relative to the casing. The casing may comprise an inlet casing between the fan and the compressor.

In the present disclosure, "axis of the turbomachine" refers to its axis of symmetry or quasi-symmetry, which forms the axis of rotation at least of the turbine, and generally also of the compressor and of the fan. The axial direction corresponds to the direction of the axis of the turbomachine and a radial direction is a direction perpendicular to this axis and intersecting this axis. Similarly, an axial plane is a plane containing the axis of the turbomachine and a radial plane is a plane perpendicular to this axis. A circumference is understood as a circle belonging to a radial plane and whose center belongs to the axis of the turbomachine. A tangential or circumferential direction is a direction tangent to a circumference; it is perpendicular to the axis of the turbomachine but does not pass through the axis.

Unless otherwise specified, the adjectives "front" and "rear" are used in reference to the axial direction, it being understood that the inlet of the turbomachine is located on the front side of the turbomachine, while its outlet is located on the rear side. The adjectives "upstream" and "downstream" are used in reference to the normal flow direction of the gases in the turbomachine.

Finally, unless otherwise specified, the adjectives "internal (inner)" and "external (outer)" are used in reference to a radial direction so that the internal portion of an element is, along a radial direction, closer to the axis of the turbomachine than the external portion of the same element.

An epicyclic gear train comprises an internal planetary gear, also known as central pinion or sun gear and simply called "sun gear" thereafter, one or several planet gears in revolution around the sun gear and a ring gear, sometimes called external planetary gear, surrounding the planet gear(s). Thereafter, without loss of generality, we will speak equally of one or several planet gear(s). The planet gears may be rotatably mounted on a planet carrier, the planet carrier being configured to synchronize the revolution of the different planet gears relative to the sun gear or to the ring gear.

Unless explicitly stated otherwise or apparent from the context, thereafter, the references to the radii and diameters of the wheels are understood as references to the pitch radii and diameters, respectively. The pitch circle is such that the pitch circles of two meshing gears have the same tangential speed.

The mechanical connection between the components of the epicyclic gear train (sun gear, planet gears, planet carrier, ring gear) and the members of the turbomachine (fan, compressor, turbine) can be ensured by means of shafts secured in rotation to said members.

Thanks to the fact that the fan and the compressor are driven in rotation by two different outputs of the epicyclic gear train, it is possible to rotate not only the fan and the turbine, but also the compressor and the turbine, at different speeds. Several factors make it necessary to increase the radius of the compressor: the integration of the epicyclic gear train, provided for the fan, in the vicinity of the compressor, but also the aerodynamic stresses of the flow-path and the integration of other elements of the turbomachine such as bearings, shafts, trunnions and ventilation. In doing so, the speed of rotation of the compressor must be reduced to prevent the tangential speed at the compressor blade tip from exceeding the applicable limits. The use of two different outputs therefore allows limiting the rotation speed (rpm) of the compressor while having the highest possible rotation speed for the turbine and a relatively low rotation speed for the fan, with a view, for example, to increasing the radius of the fan.

The second output stage is coupled to the first output stage, which means that there is a functional connection between the first output stage and the second output stage, allowing the transmission of a torque between these two output stages. Thanks to the fact that the epicyclic gear train is a multi—stage epicyclic gear train comprising at least a first output stage and a second output stage coupled to each other, the turbomachine can maintain good compactness despite a potentially very high turbine— fan reduction ratio (typically above 5). By comparison, a single—stage epicyclic gear train with a comparable reduction ratio would be radially bulky and would require either providing a radially outward offset, sometimes called "gooseneck", and an axial elongation of the turbomachine, or placing the compressor to a larger radius and therefore limiting its speed, which affects its efficiency.

Finally, thanks to the fact that the compressor is driven in rotation by the ring gear of the first output stage, it is possible to obtain a reduction ratio between the compressor and the turbine proportional to the ratio of the radii of the sun gear and of the ring gear of the first output stage, while maintaining a slower output on the ring gear of the second stage. By contrast, if the compressor was driven by the sun gear of the first output stage, the input driven by the turbine should be the internal planetary gear of the second stage. The second output stage driving the fan in rotation, this configuration would leave only one stage to achieve the reduction ratio between the fan and the turbine:this would therefore bring the architecture back to space requirement problems described above. Moreover, the fact of not using the inner planetary gears of all the stages facilitates the integration of inner abutments to the epicyclic gear train in order to take up the inner forces when using herringbone teeth.

Together, these characterstics improve the integration of the compressor and the overall efficiency of the turbomachine.

In some embodiments, the fan is driven in rotation by the ring gear of the second output stage. Thus, two stages of the epicyclic gear train are used to obtain relatively high reduction ratios with a reasonable radial space requirement.

In some embodiments, the epicyclic gear train comprises at least one planet gear comprising a first wheel and a second wheel secured in rotation to each other, the first wheel belonging to the first output stage and meshing with the ring gear of the first output stage and the second wheel belonging to the second output stage. The first wheel and the second wheel can belong to the same part forming the planet gear.

If necessary, the second wheel can mesh with the ring gear of the second output stage.

In some embodiments, the ratio between the diameter of the first output wheel and the diameter of the second output wheel is comprised between 0.5 and 10.

In some embodiments, the epicyclic gear train comprises a planet carrier fixed relative to the casing. The planet carrier being fixed, the ring gear of each output stage and the sun gear are driven in rotation.

Thus, in some embodiments, the input of the epicyclic gear train comprises a sun gear of the epicyclic gear train. In other words, the turbine is configured to drive in rotation the sun gear of the epicyclic gear train. This choice allows obtaining a reduction in the speed of rotation while limiting the complexity and the space requirement.

In some embodiments, the compressor is supported relative to the casing by at least one bearing. For example, the bearing can be a ball bearing or a roller bearing. Several bearings can also be provided, at least one, several or all of the bearings being arranged between the compressor and the casing.

In some embodiments, the turbomachine further comprises a bearing arranged between a shaft of the compressor and a shaft of the turbine. Such a bearing, installed between two rotating portions, is generally called intershaft bearing. For example, the intershaft bearing may be a roller bearing. Several bearings can also be provided, at least one, several or all of the bearings being arranged between a shaft of the compressor and a shaft of the turbine. An intershaft bearing arranged in this way allows limiting the space requirement of the stator portions under the compressor.

In some embodiments, three elements among a fan shaft, a compressor shaft, a turbine shaft and the casing comprise a locally more flexible portion able to accommodate axial displacements of said elements. The portion is said to be locally more flexible in the sense that it locally has less rigidity than the surrounding portions. Said portion therefore forms an area of preferential and facilitated deformation to accommodate the displacements. Indeed, the epicyclic gear train being hyperstatic, the relative displacements of the input and the output stages, in particular in the axial direction, tend to cause overloads in the components of the epicyclic gear train. The respective locally more flexible portions allow reducing, if not avoiding, these overloads. The fourth element among the aforementioned elements can be relatively more rigid than the locally more flexible portions. The component of the epicyclic gear train coupled to this element is called "master" insofar as it imposes its displacements on the other components of the epicyclic gear train, called "slaves" and which, through the locally more flexible portions, do not cause displacement of the corresponding turbomachine members.

In some embodiments, said portion has meanders in axial section. The axial section is a section in an axial plane as defined above. The meanders define a non-purely axial shape, for example having a non-zero radial component. The meanders can comprise sinuosities, broken line, zigzag, chicane shapes, etc.

In some embodiments, said fan is the only fan of the turbomachine. The turbomachine therefore does not comprise any other fan.

In some embodiments, said compressor is a low-pressure compressor and the turbomachine further comprises a high-pressure compressor downstream of the low-pressure compressor, the casing comprising an inter-compressor casing between the low-pressure compressor and the high-pressure compressor.

In some embodiments, a fan shaft is supported relative to the inlet casing by at least one bearing. Optionally, the fan shaft is supported relative to the inlet casing by at least two bearings. Optionally, these two bearings comprise at least one ball bearing and at least one roller bearing.

Furthermore, the present disclosure also relates to an aircraft turbomachine comprising a casing, a fan, a compressor and a turbine, and an epicyclic gear train comprising an input driven in rotation by the turbine, a first output stage and a second output stage coupled to the first output stage, in which the turbine is configured to drive in rotation a sun gear of the first output stage, the fan is driven in rotation by the ring gear of the second output stage, and the compressor is driven in rotation by the ring gear of the first output stage or by the sun gear of the second output stage.

This turbomachine may have all or part of the characteristics detailed elsewhere in the present disclosure.

BRIEF DESCRIPTION OF THE DRAWINGS

Other characteristics and advantages of the object of the present disclosure will emerge from the following description of embodiments, given by way of non-limiting examples, with reference to the appended figures.

DETAILED DESCRIPTION

Figure 1:
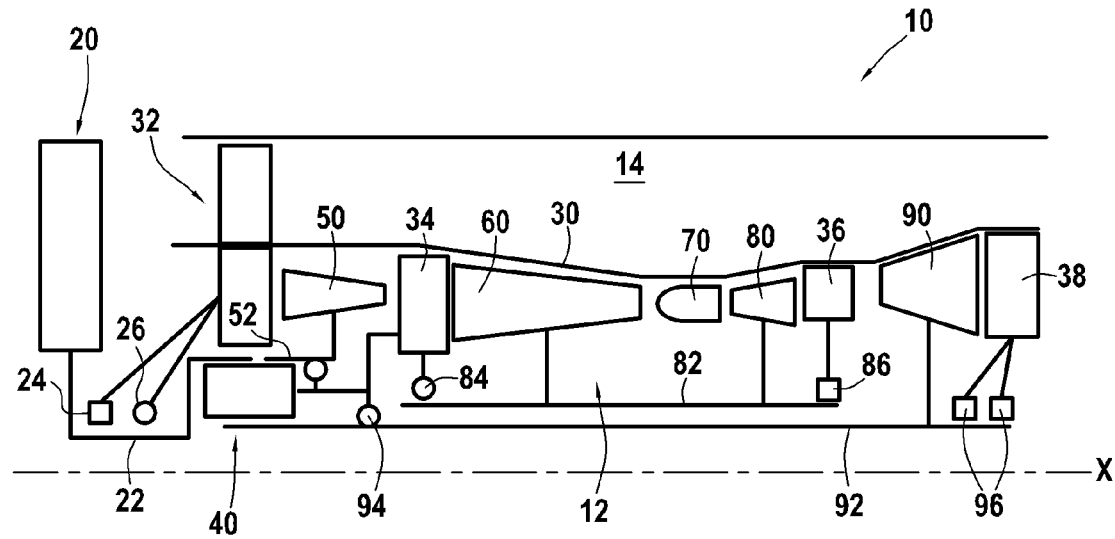
FIG. 1 is a schematic overview of a turbomachine according to one embodiment.

An aircraft turbomachine 10 according to one embodiment is schematically represented in FIG. 1, in longitudinal half-section. In this case, the turbomachine 10 is a two-spool, dual-flow turbojet engine. Indeed, the turbomachine 10 comprises a fan 20, preferably a single fan, an inner casing 30 disposed downstream of the fan 20 and separating a primary flowpath 12 from a secondary flowpath 14. A low-pressure compressor (LP compressor) 50, a high-pressure compressor (HP compressor) 60, a combustion chamber 70, a high-pressure turbine (HP turbine) 80 and a low-pressure turbine (LP turbine) 90 are arranged in the primary flowpath 12, from upstream to downstream. Because the turbomachine 10 is a two-spool turbomachine, it includes two kinematically independent rotating assemblies, namely on the one hand a high-pressure body (HP body), comprising the HP compressor 60 and the HP turbine 80, and on the other hand a low-pressure body (LP body) comprising the LP compressor 50 and the LP turbine 80. Each compressor 50, 60 is directly or indirectly driven by the turbine 80, 90 of the corresponding body, the turbines 80, 90 being set in motion by the combustion gases coming from the combustion chamber 70.

However, the present disclosure can be transposed to the case of a single-spool turbomachine. The single body would have the function of the HP body for the operation of the turbomachine, but its role in relation to the epicyclic gear train described below would be that of the LP body.

The casing of the turbomachine further comprises, in this embodiment, an inlet casing 32 between the fan 20 and the LP compressor 50, an inter-compressor casing 34 between the LP compressor 50 and the HP compressor 60, an inter-turbine casing 36 between the HP turbine 80 and the LP turbine 90, and a turbine rear casing 38 (or turbine rear frame) downstream of the LP turbine 90. The casing elements are fixed in the reference frame of the aircraft, and the rotating portions, namely the movable bladed wheels of the fan 20, of the compressors 50, 60 and of the turbines 80, 90, rotate relative to the casing.

The rotation of the HP turbine 80 drives the HP compressor 60 via a HP shaft 82. The HP compressor 60 and the HP turbine 80 are therefore kinematically dependent on each other and, particularly here, rotate at the same speed. The HP shaft 82 can be supported relative to the casing by at least one bearing, in this case a first bearing 84, typically a ball bearing, relative to the inter-compressor casing 34 and a second bearing 86, typically a roller bearing, relative to the inter-turbine casing 36.

Furthermore, in this embodiment, the LP turbine 90 drives in rotation the LP compressor 50. The LP turbine 90 also drives in rotation the fan 20. More specifically, the turbomachine 10 comprises a transmission, here an epicyclic gear train 40, coupled to LP turbine 90 via LP turbine shaft 92. In this embodiment, the LP turbine shaft 92 is arranged coaxially inside the HP shaft 82. Bearings 94, 96 can be provided to support the LP turbine shaft 92.

Furthermore, as illustrated in FIG. 1, the epicyclic gear train 40 is further coupled to the fan 20 and to the LP compressor 50 in order to modify the rotational speed transmission ratio between the LP turbine 90 and the fan 20 on the other hand, the LP compressor 50 on the other hand. The epicyclic gear train 40 therefore forms a reduction gear between the LP turbine 90 and the fan 20 on the one hand, the LP compressor 50 on the other hand.

In other words, as illustrated in FIG. 1, the epicyclic gear train 40 comprises an input driven in rotation by the LP turbine 90, a first output stage configured to drive in rotation the LP compressor 50 and a second output stage coupled to the first output stage and configured to drive in rotation the fan 20.

Figure 2:
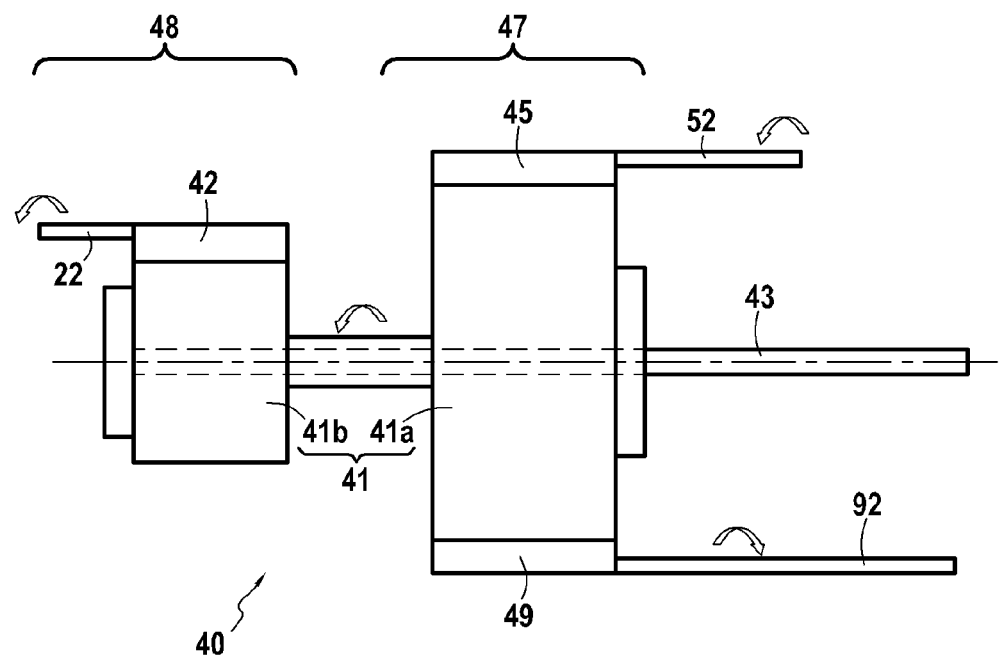
FIG. 2 is a diagram of an epicyclic gear train according to one embodiment.

The structure of the epicyclic gear train 40 is represented in detail in the diagram of FIG. 2.

The epicyclic gear train 40 comprises a sun gear 49. In this embodiment, the sun gear 49 is driven in rotation by the LP turbine 90. More specifically, the sun gear 49 can be driven in rotation, even secured in rotation, to the LP turbine shaft 92. Thus, in this embodiment, the input of the epicyclic gear train 40 comprises the sun gear 49.

The sun gear 49 meshes with at least one planet gear 41. The planet gear 41 rotates on itself. The planet gear 41 follows a movement of revolution around the sun gear 49 but, as the sun gear 49 itself rotates, the planet gear 41 can have a fixed axis of rotation in the reference frame of the turbomachine 10, as will be illustrated thereafter.

The planet gear 41 comprises a first wheel 41a and a second wheel 41b. The first wheel 41a and the second wheel 41b are coupled to each other, and more specifically here secured in rotation to each other. The first wheel 41a belongs to the first output stage 47 of the epicyclic gear train 40. The second wheel 41b belongs to the second output stage 48 of the epicyclic gear train 40.

The planet gear 41 is rotatably mounted on a planet carrier 43. The planet carrier 43 is here fixed relative to the casing 30, for example, as schematized in FIG. 1, fixed on the inter-compressor casing 34.

The epicyclic gear train 40 furthermore comprises two ring gears 42, 45. The first ring gear 45, or ring gear of the first output stage 47, meshes with the planet gear 41, more particularly its first wheel 41a. Furthermore, the first ring gear 45 is configured to drive in rotation the LP compressor 50. More specifically, the first ring gear 45 can drive in rotation, even be secured in rotation to a LP compressor shaft 52 itself secured in rotation to the LP compressor 50.

The second ring gear 42, or ring gear of the second output stage 48, meshes with the planet gear 41, more particularly its second wheel 41b. Furthermore, the second ring gear 42 is configured to drive in rotation the fan 20. More specifically, the second ring gear 42 can drive in rotation, even be secured in rotation to a fan shaft 22 itself secured in rotation to the fan 20.

The fan shaft 22 can be supported relative to the casing 30, in particular relative to the inlet casing 32, by at least one bearing. In this case, as illustrated in FIG. 1, the at least one bearing can comprise at least two bearings, namely at least one roller bearing 24 and at least one ball bearing 26.

The planet carrier 43 being fixed relative to the casing, the rotation of the sun gear 49 is transmitted to the ring gears 42, 45 via the planet gear 41.

Thus, in operation, the rotation of the LP turbine 90 is transmitted, via the LP turbine shaft 92, to the sun gear 49. The rotation of the sun gear 49 drives in rotation the planet gear 41. The first output stage 47 drives in rotation the LP compressor 50 via the first wheel 41a, the first ring gear 45 and the LP compressor shaft 52. The second output stage 48 drives in rotation the fan 20 via the second wheel 41b, the second ring gear 42 and the fan shaft 20.

By noting $R_i$ the functional radius of a component i with respect to its axis of rotation (for example $R_{42}$ for the inner radius of the second ring gear 42) and $\Omega_i$ the speed of rotation of the component i, the relations $R_{49}\Omega_{49}=R_{41a}\Omega_{41}$, $R_{41a}\Omega_{41}=R_{45}\Omega_{45}$, and $R_{41b}\Omega_{41}=R_{42}\Omega_{42}$ are obtained, from which it is derived that the speed of rotation of the first ring gear 45, and therefore of the LP compressor shaft 52, is equal to $\Omega_{45}=(R_{49}/R_{45})\Omega_{49}$, and that the speed of rotation of the second ring gear 42, and therefore of the fan shaft 22, is equal to $\Omega_{42}=(R_{49}/R_{41a})(R_{41b}/R_{42})\Omega_{49}$.

For the dimensioning of the relative speeds of the fan 20 and of the LP compressor, the planet gear 41 can be designed so that the ratio between the diameter of the first output wheel and the diameter of the second output wheel is comprised between 0.5 and 10.

The configuration of the epicyclic gear train 40 being given as above, its detailed implementation can be designed by the person skilled in the art according to his general knowledge.

Furthermore, although an epicyclic gear train 40 has been described here, the sun gear 49 of which forms the input and the ring gears 42, 45 form the outputs, it is possible to choose otherwise the components of the epicyclic gear train 40 forming the input and the outputs, for example according to the desired speed reduction ratios. These changes can be made even if it means adding if necessary an additional wheel to the planet gear 41 in order to offer more freedom of design.

Figure 3:
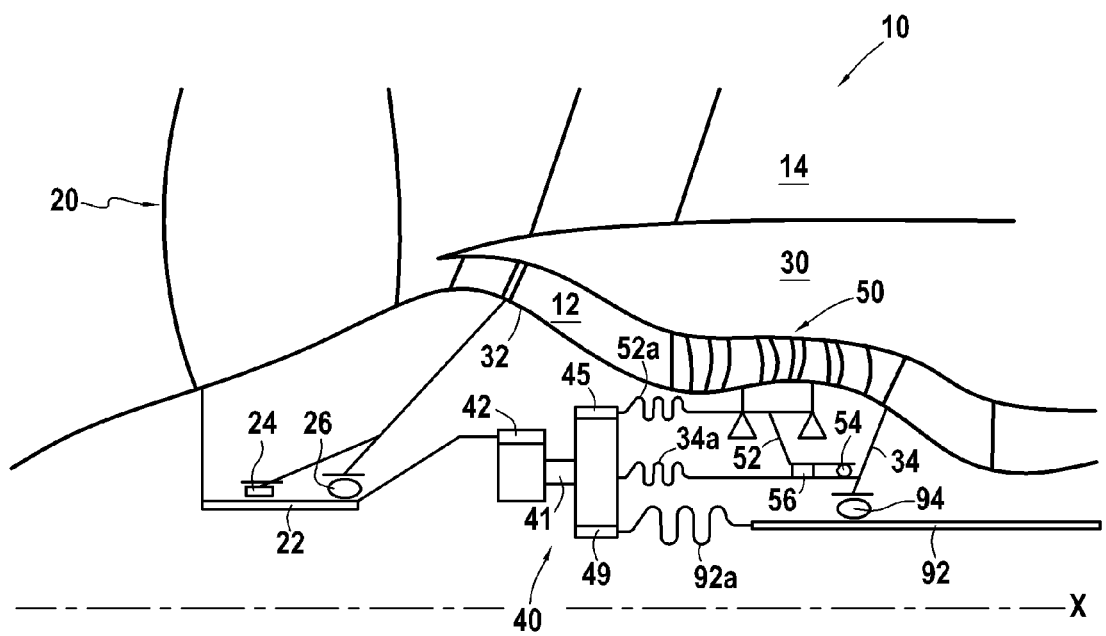
FIG. 3 is part of a longitudinal section of the turbomachine according to a first embodiment.

The practical integration of the epicyclic gear train 40 in a turbomachine is illustrated, according to a first embodiment, in FIG. 3. The presence of the epicyclic gear train 40 and of separate shafts for the LP turbine 90 and the LP compressor 50 indeed imposes to review the architecture of the turbomachine, particularly the location of the bearings.

Thus, in this first embodiment, the turbomachine 10 comprises at least one bearing configured to support the LP compressor 50 relative to the casing 30. In this case, two bearings 54, 56 are provided. The bearings 54, 56 are here arranged between the inter-compressor casing 34 and the LP compressor shaft 52. More specifically, the bearings 54, 56 are arranged on the portion of the casing 30 on which the planet carrier 43 is fixed.

In this embodiment, the bearing 54 (third bearing) can be a ball bearing, while the bearing 56 (fourth bearing) can be a roller bearing. However, the bearings 54, 56 can be interchanged and/or be of another type, even if it is desirable that at most one of the bearings is a ball bearing, so as to avoid a hyperstatic mounting of the bearings.

The presence of two bearings ensures the holding and prevents the swiveling of the LP compressor 50, that is to say the risk that a single bearing behaves like a swivel in case of an excessive off-center radial load, which would result in no longer ensuring the coaxiality of the rotor of the LP compressor 50 with its stator, and therefore in damaging it.

Furthermore, to avoid a hyperstatic mounting of the epicyclic gear train 40, it is possible to provide that three elements among the fan shaft 22, the LP compressor shaft 52, the LP turbine shaft 92 and the casing 30 (in this case the inter-compressor casing 34) comprise a locally more flexible portion able to accommodate axial displacements of said elements. In this case, the fan shaft 22 is designed relatively rigid or stiff, while locally flexible portions 34a, 52a, 92a are provided respectively on the inter-compressor casing 34, the LP compressor shaft 52 and the LP turbine shaft 92.

As illustrated in FIG. 3, said locally flexible portions are provided on the shafts between the epicyclic gear train 40 and the bearings supporting the corresponding members of the turbomachine, for example the bearings 54, 56. Thus, the relative axial and/or radial displacements within the epicyclic gear train 40, even the axial and/or radial displacements of the fan shaft 22, are absorbed by the locally flexible portions 34a, 52a, 92a and do not disturb the operation of the bearings nor, more generally, the dynamics of the turbomachine 10.

In this embodiment, at least one of said locally flexible portions 34a, 52a, 92a, here all of them, have meanders in axial section. The meanders are here formed by an axial succession of radially increasing and decreasing sections. The meanders provide flexibility without compromising the mechanical strength of the turbomachine 10.

When an element is supported by both a ball bearing and a roller bearing, it is possible to provide, as illustrated in FIG. 1, that the ball bearing is closer to the epicyclic gear train 40 than the roller bearing, in order to minimize the axial clearances inside the epicyclic gear train 40. This property can be provided independently for each element. This results in an optimized support of the epicyclic gear train.

FIGS. 4 to 7 show the turbomachine in other embodiments. In these figures, the elements corresponding or identical to those of the first embodiment will receive the same reference sign and will not be described again.

Figure 4:
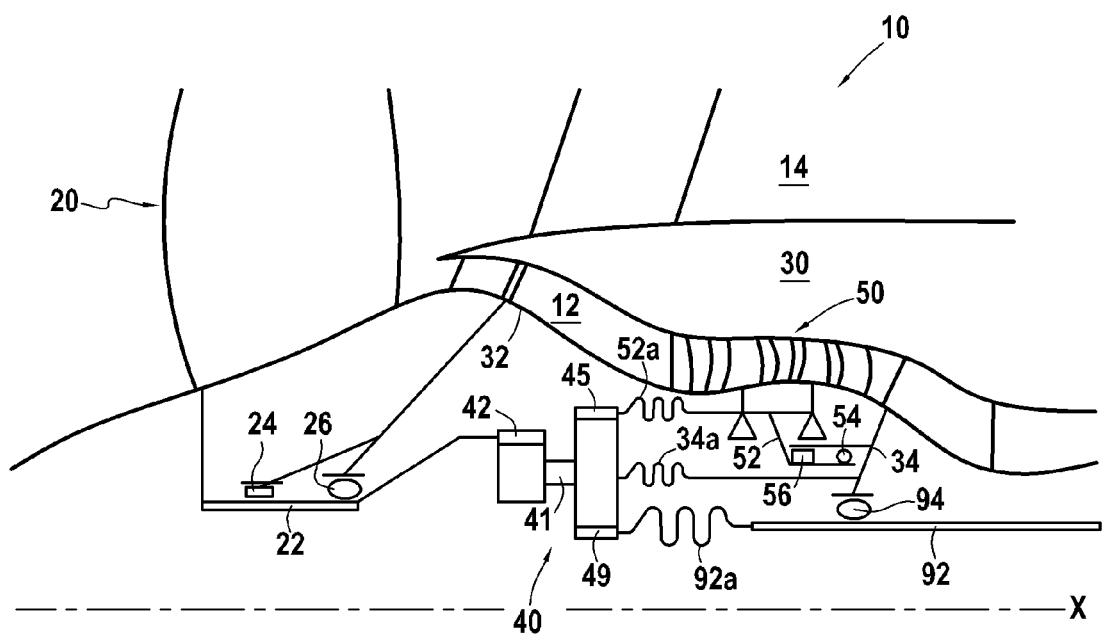
FIG. 4 is part of a longitudinal section of the turbomachine according to a second embodiment.
Figure 5:
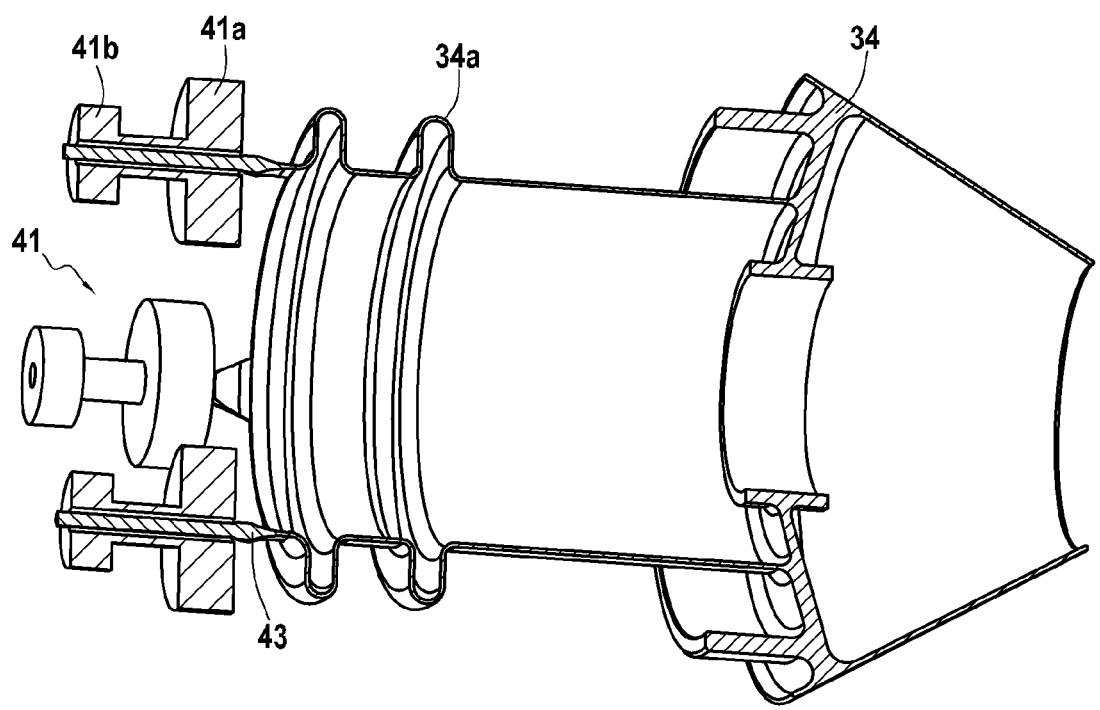
FIG. 5 is a longitudinal and perspective sectional view of part of the turbomachine according to the second embodiment.

In the second embodiment, illustrated in FIGS. 4 and 5, which shows one variant of the first embodiment, the bearings 54, 56 are arranged between the LP compressor shaft 52 and a portion of the inter-compressor casing 34 independent of the portion on which the planet carrier 43 is fixed. This configuration allows closing the clearances of the bearings 54, 56, and more particularly of the ball bearing 54: indeed, the rotor is located radially inside the stator. Under centrifugal force, the rotor/stator clearance closes.

FIG. 5 illustrates more particularly the arrangement of the planet gears 41, here four in number (three of which are visible in the figure), on the planet carrier 43 and the holding of the planet carrier 43 relative to the inter-compressor casing 34. In the view represented, the inter-compressor casing 34 and the planet carrier 43 are integrally formed, but alternatively, it is possible to provide a fixing between the inter-compressor casing 34 and the planet carrier 43, for example to facilitate the mounting of the epicyclic gear train 40.

Figure 6:
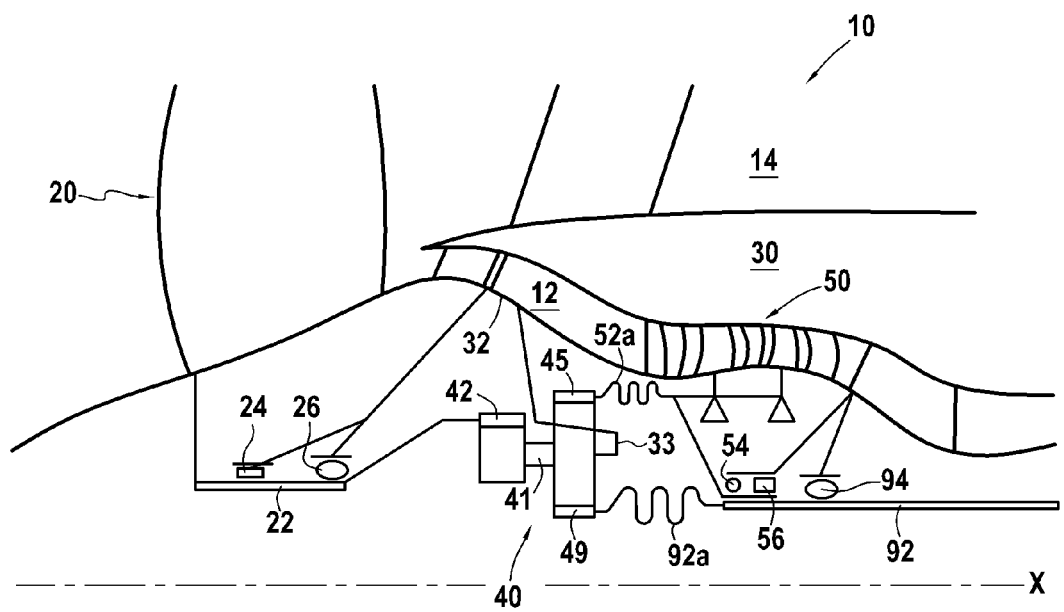
FIG. 6 is part of a longitudinal section of the turbomachine according to a third embodiment.

In the third embodiment, illustrated in FIG. 6, the bearings 54, 56 are arranged between the LP compressor shaft 52 and the inter-compressor casing 34. However, the planet carrier 43 is for its part fixed not on the inter-compressor casing 34, but on the inlet casing 32. To do so, for example, the support of the planet carrier 43 passes between two consecutive planet gears 41. This frees up space to position the bearings 54, 56 closer to the axis of rotation X, which urges them less mechanically. In addition, it allows freeing up space under the LP compressor 50, which facilitates the integration under the LP compressor 50 and allows lowering the bores, thus reducing the mass of the disks.

In addition, the inlet casing 32 being positioned forwardly relative to the planet carrier 43, the junction between the planet carrier 43 and the inlet casing 32 forms, as illustrated in FIG. 6, a return bend 33. The return bend can have a portion extending axially forwards and radially outwards. The return bend 33 can form a locally more flexible portion able to accommodate axial displacements of the epicyclic gear train 40 relative to the inlet casing 32. In addition, the fact that the part linking the planet carrier 43 to the inlet casing 32 is perforated at the level of the planet gears 41 allows accommodating radial displacements of the epicyclic gear train 40 relative to the inlet casing 32. Thus, in these embodiments, the casing 30 can be devoid of meanders. This allows reducing the length and space requirement of the engine.

Figure 7:
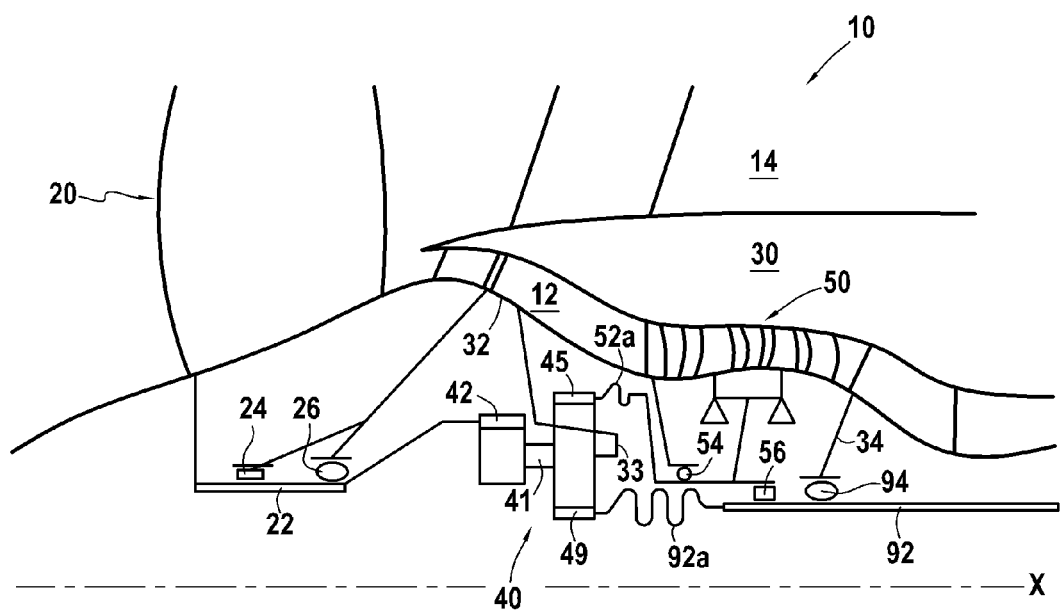
FIG. 7 is part of a longitudinal section of the turbomachine according to a fourth embodiment.

In the fourth embodiment, illustrated in FIG. 7, which shows one variant of the third embodiment, the third bearing 54 supports the LP compressor 50 relative to the casing 30, here relative to the inlet casing 32. The fourth bearing 56, in this case the roller bearing, is arranged between the shaft of the LP compressor 52 and the LP turbine shaft 92. The fourth bearing 56 therefore forms an intershaft bearing. As indicated above, the integration of an intershaft bearing allows limiting the space requirement of the stator parts under the LP compressor 50.

Throughout the present disclosure, when it comes to the driving, this driving may be direct, that is to say particularly without intermediate transmission stage.

Although the present description refers to specific exemplary embodiments, modifications can be made to these examples without departing from the general scope of the invention as defined by the claims. Furthermore, individual characteristics of the different illustrated or mentioned embodiments can be combined in additional embodiments. Accordingly, the description and drawings should be considered in an illustrative rather than restrictive sense.

The invention claimed is:

1. An aircraft turbomachine comprising a casing, a fan, a compressor and a turbine, the casing comprising an inlet casing between the fan and the compressor, the turbomachine further comprising an epicyclic gear train comprising an input driven in rotation by the turbine, a first output stage configured to drive in rotation the compressor and a second output stage coupled to the first output stage and configured to drive in rotation the fan, the compressor being driven in rotation by a first ring gear, the first ring gear being the ring gear of the first output stage, wherein the first ring gear is radially outside of at least one planet gear of the first output stage.

2. The turbomachine according to claim 1, wherein the fan is driven in rotation by a second ring gear, the second ring gear being the ring gear of the second output stage.

3. The turbomachine according to claim 1, wherein the at least one planet gear comprises a first wheel and a second wheel secured in rotation to each other, the first wheel belonging to the first output stage and meshing with the ring gear of the first output stage and the second wheel belonging to the second output stage.

4. The turbomachine according to claim 3, wherein a ratio between a diameter of the first output wheel and a diameter of the second output wheel is comprised between 0.5 and 10.

5. The turbomachine according to claim 1, wherein the epicyclic gear train comprises a planet carrier fixed relative to the casing.

6. The turbomachine according to claim 1, wherein the input comprises a sun gear of the epicyclic gear train.

7. The turbomachine according to claim 1, wherein the compressor is supported relative to the casing by at least one bearing.

8. The turbomachine according to claim 1, further comprising a bearing arranged between a shaft of the compressor and a shaft of the turbine.

9. The turbomachine according to claim 1, wherein three elements among a fan shaft, a compressor shaft, a turbine shaft and the casing comprise a locally more flexible portion able to accommodate axial displacements of said elements.

10. The turbomachine according to claim 9, wherein said portion has meanders in axial section.

11. The turbomachine according to claim 1, wherein said fan is the only fan of the turbomachine.

12. The turbomachine according to claim 1, wherein said compressor is a low-pressure compressor and the turbomachine further comprises a high-pressure compressor downstream of the low-pressure compressor, the casing comprising an inter-compressor casing between the low-pressure compressor and the high-pressure compressor.

13. The turbomachine according to claim 1, wherein a fan shaft is supported relative to the inlet casing by at least one bearing.

* * * * *